United States Patent [19]
Tokura

[11] Patent Number: 5,815,913
[45] Date of Patent: Oct. 6, 1998

[54] METHOD AND APPARATUS FOR MANUFACTURING A HEAT EXCHANGER

[75] Inventor: Kenji Tokura, Osaka, Japan

[73] Assignee: Kyoshin Kogyo Co., Ltd., Osaka, Japan

[21] Appl. No.: 655,757

[22] Filed: May 30, 1996

[30] Foreign Application Priority Data

Jun. 1, 1995 [JP] Japan .................................. 7-135287
Nov. 7, 1995 [JP] Japan .................................. 7-288543

[51] Int. Cl.⁶ ...................................................... B23P 15/26
[52] U.S. Cl. ........................................ 29/727; 29/890.042
[58] Field of Search ............................. 29/890.047, 727, 29/726

[56] References Cited

U.S. PATENT DOCUMENTS

| | | | |
|---|---|---|---|
| 4,766,667 | 8/1988 | Gray | 29/523 |
| 4,839,950 | 6/1989 | Stroup | 29/727 |
| 5,003,691 | 4/1991 | Milliman et al. | 29/727 |
| 5,070,608 | 12/1991 | Gray | 29/727 |
| 5,220,727 | 6/1993 | Milliman et al. | 29/727 |
| 5,353,496 | 10/1994 | Harman et al. | 29/727 |
| 5,533,251 | 7/1996 | Vetter | 29/727 |
| 5,680,695 | 10/1997 | Vetter | 29/727 |
| 5,687,473 | 11/1997 | Tokura | 29/727 |

*Primary Examiner*—I. Cuda
*Attorney, Agent, or Firm*—Nikaido, Marmelstein, Murray & Oram LLP

[57] ABSTRACT

A method of manufacturing a heat exchanger with a plurality of radiation fins which are stacked on a plurality of hairpin tubes or straight tubes includes the steps of clamping bent portions of the hairpin tubes or one ends of the straight tubes in such a manner as to arrest axial movement thereof by a clamp having at least one pair of clamping jaws, press fitting a plurality of mandrels respectively into openings of the hairpin tubes, or openings of the straight tubes which are opposite to the clamped ends to form expanded portions of a predetermined length, moving a plurality of grippers, each of which includes a plurality of gripping strips with their longitudinal axes coaxially aligned with the tubes, from a withdrawal position to an operative position in such a manner as to grip each of the expanded portions of the tubes, while maintaining a predetermined clearance between the adjacent gripping strips, and moving the mandrels within the tubes in such a manner as to expand the tubes through their entire lengths into tight, interlocked relationship with the radiation fins.

10 Claims, 5 Drawing Sheets

METHOD AND APPARATUS FOR MANUFACTURING A HEAT EXCHANGER

BACKGROUND OF THE INVENTION

This invention relates to a method and apparatus for manufacturing a heat exchanger, and more particularly, a method and apparatus for manufacturing a heat exchanger, which can radially expand a plurality of hairpin tubes or straight tubes, on which a plurality of radiation fins are stacked, into tight, interlocked relationship with the radiation fins, while preventing the tubes from shrinking in the axial direction thereof.

There has been disclosed a conventional method of manufacturing the heat exchanger which can prevent the hairpin tubes from shrinking in the axial direction thereof in Japanese Patent Laid-open No. 63-188433, as illustrated in FIGS. 6A, 6B, 6C and 6D. The method comprises the steps of fixing bent portions of hairpin tubes, on which a plurality of radiation fins 6 are loosely stacked, by hooks 10, press fitting mandrels 2 into openings 7b of the hairpin tubes 7 for forming expanded portions 7d of a predetermined length, fixing the expanded portions 7d of the hairpin tubes 7 respectively within a plurality of through holes 9 defined in a clamping member 8 in such a manner as to arrest motion of the hairpin tubes 7 in the axial direction thereof, and moving the mandrel 2 towards the bent portions 7a within the respective hairpin tubes 7 so that the hairpin tubes 7 are expanded through their entire lengths into tight, interlocked relationship with the radiation fins 6.

With this method, during the mandrels 2 advance forwards within the corresponding hairpin tubes 7, the clamping member 8 and the hooks 10 prevent the hairpin tubes 7 from moving in the axial direction thereof so that the radial expansion of the hairpin tube 7 can be achieved via the effect that a wall of the hairpin tube 7 become thinner. As a result, it is possible to minimize the shrinkage of the hairpin tubes 7 in the axial direction thereof.

This method is effective when the tubes, which are arranged in one or two lines, are clamped by the clamping member 8, as illustrated in FIG. 6B. That is, when the hairpin tubes 7 are arranged in two lines, the hairpin tubes 7 in the both lines are arranged in zigzag manner relative to each other. Thereby, the clamping member 8 in the form of a pair of plates can clamp all the hairpin tubes 7 from the both sides. However, when the hairpin tubes 7 are arranged in three or more lines, the hairpin tubes 7 of a middle line can not be clamped by the clamping member 8 of the above arrangement. As a further problem, when the hairpin tubes 7 with a different diameter are to be expanded, the through holes 9 of the clamping member 8 may not fit on the hairpin tubes 7 anymore. As a result, it is impossible to clamp the hairpin tubes 7 via the through holes 9.

To solve the above problems, it has been proposed that a squeezing mechanism is employed for each through hole 9 of the clamping member 8 to independently clamp respective straight portions 7c of the hairpin tubes 7, as illustrated in FIG. 6D. This mechanism enables the clamping member 8 to clamp the hairpin tubes 7 via the through holes 9, even if the hairpin tubes 7 are arranged in three or more lines. However, when a space between the hairpin tubes 7 is small, the squeezing mechanism, which needs a relatively large space for installation, may not be accommodated in the space between the adjacent through holes 9 of the clamp 8.

Another problem is that the curve of the hook 10 is unlikely to snugly fit around the curve of the bent portions 7a of the hairpin tubes 7 with a different diameter. This may cause the deformation of the bent portions 7a via the expansion force effected by the mandrels 2. To avoid this problem, it is necessary to replace the hooks 10 with the new ones with such a curve as to fit on the hairpin tube 7 with a different diameter.

It is an object of the present invention to provide a method and apparatus for manufacturing a heat exchanger, which can securely and rigidly hold all of the hairpin tubes or straight tubes, while preventing the hairpin tubes from shrinking in the axial direction thereof without any damages to the tubes during the mandrels expand the tubes, and omitting any necessity to replace parts or the like, even if the tubes are arranged in three or more lines, or the hairpin tubes are replaced with those having a different diameter.

SUMMARY OF THE INVENTION

In accordance with the present invention, a method of manufacturing a heat exchanger with a plurality of radiation fins which are stacked on a plurality of hairpin tubes or straight tubes, includes the steps of clamping bent portions of the hairpin tubes or one ends of the straight tubes in such a manner as to arrest axial movement thereof by a clamp having at least one pair of clamping jaws, press fitting a plurality of mandrels respectively into openings of the hairpin tubes, or openings of the straight tubes which are opposite to the clamped ends to form expanded portions of a predetermined length, moving a plurality of grippers, each of which includes a plurality of gripping strips with their longitudinal axes coaxially aligned with the tubes, from a withdrawal position to an operative position in such a manner as to grip each of the expanded portions of the tubes, while maintaining a predetermined clearance between the adjacent gripping strips, and moving the mandrels within the tubes in such a manner as to expand the tubes through their entire lengths into tight, interlocked relationship with the radiation fins.

An apparatus for manufacturing a heat exchanger with a plurality of radiation fins which are stacked on a plurality of hairpin tubes or straight tubes includes a clamp which, in turn, includes at least one pair of clamping jaws for clamping bent portions of the hairpin tubes or one ends of the straight tubes in such a manner as to arrest axial movement thereof, mandrels coaxially and respectively aligned with the hairpin tubes or straight tubes, and being press fittable into openings of the hairpin tubes, or openings of the straight tubes which are opposite to the clamped ends in such a manner as to form expanded portions of a predetermined length, a gripper with a plurality of gripping strips with their longitudinal axes coaxially aligned with the hairpin tubes or the straight tubes, the gripping strips being movable between a withdrawal position and an operative position in such a manner as to timely grip the expanded portions of the hairpin tubes or the straight tubes with a predetermined clearance between the adjacent gripping strips during the mandrels expand the tubes through their entire lengths into tight, interlocked relationship with the radiation fins.

The gripper of the above arrangement is slim, and therefore a plurality of the grippers can be arranged closer to each other. This enables the tubes to be securely and rigidly gripped, even if they are arranged in three or more lines. In addition, even if the tubes with a different diameter are to be expanded, it is not necessary to replace the grippers with the new ones corresponding in size to the new tubes, since the gripping strips of each gripper are arranged in such a manner as to define a predetermined clearance to each other when gripping the tube.

BRIEF DESCRIPTION OF THE DRAWINGS

FIGS. 6 illustrate a conventional apparatus.

DETAILED DESCRIPTION OF THE PREFERRED EMBODIMENTS

Figure 1:
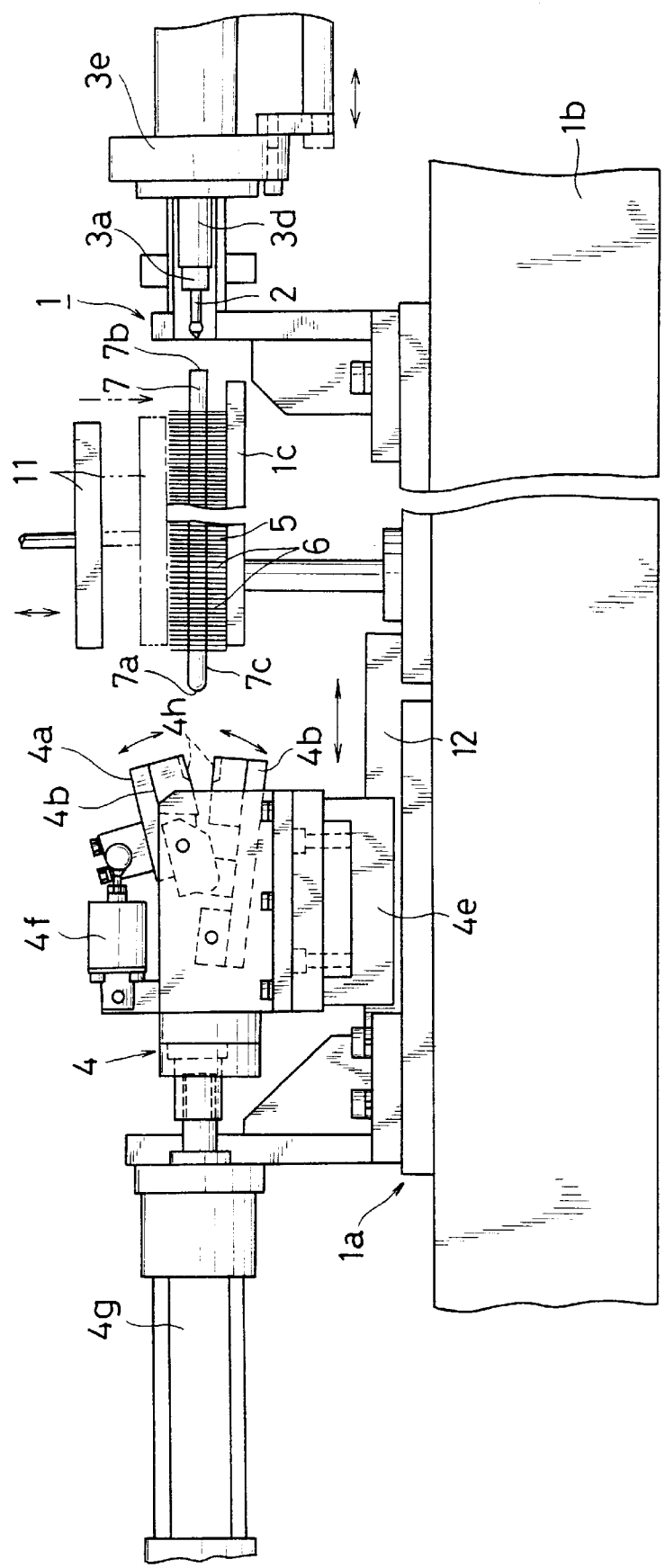
FIG. 1 is a front elevation illustrating one embodiment of an apparatus for manufacturing a heat exchanger in accordance with the present invention.

Referring to FIG. 1, an apparatus for manufacturing a heat exchanger, which includes an apparatus body 1a, and a block 1b, on which the apparatus body 1a is mounted. A mounting table 1c is provided on the block 1b to mount thereon a heat exchanger with a plurality of hairpin tubes 7, on which a plurality of radiation fins are loosely stacked. A pressure plate 11 is positioned above the mounting table 1c, and is vertically movable in such a manner as to timely press the heat exchanger 5 from above and fix the same in position in cooperation with the mounting table 1c.

Figure 2A:
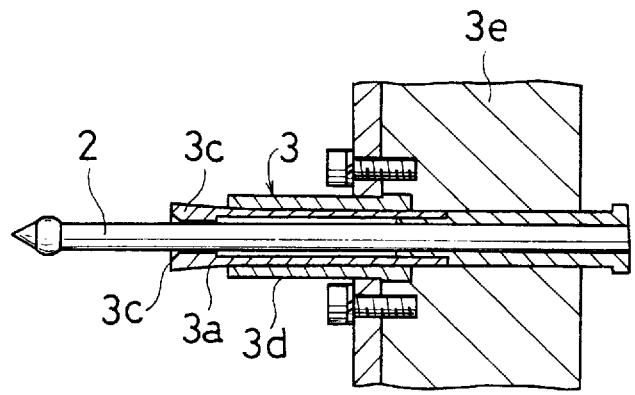
FIGS. 2A and 2B are cross section illustrating a gripper of the apparatus.
Figure 2B:
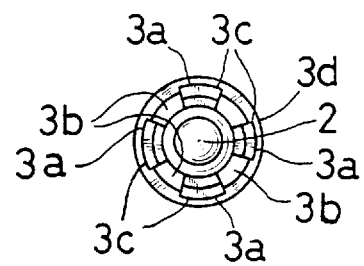

A plurality of reciprocable mandrels 2 are provided on the apparatus body 1a in such a manner as to be coaxially aligned with the corresponding tubes 7, with their tip portions facing respectively openings 7b of the hairpin tubes 7. Referring to FIGS. 2A and 2B, a tube gripping mechanism includes a gripper 3 which, in turn, includes four gripping strips 3a with a predetermined space 3b to each other, one ends of which are fixed to a reciprocable member (not shown). The gripping strips 3a of the gripper 3 extend along the corresponding mandrel 2 from a reciprocable member (not shown) and are terminated with slanting portions 3c having their outer surfaces gradually slanting in the radial and outward directions as they advance forwards. A guiding cylinder 3d is connected to a reciprocable plate member 3e, the both of which define a passage for allowing the four gripping strips 3a to pass therethrough. The reciprocable plate member 3e is connected to a driving cylinder to enable the guiding cylinder 3d to slide along the outer surfaces of the slanting portions 3c, thereby moving the gripping strips 3a radially and inwardly.

A clamping mechanism 4 includes a clamp 4a which includes a pair of clamping jaws 4b which are pivotally movable to timely clamp bent portions 7a of the hairpin tubes 7 protruding from the radiating fins 6, a driving cylinder 4e for driving the clamping jaws 4b, a base 4e on which the clamping jaws 4b and the driving cylinder 4f are positioned, a guide rail 12 along which the base 4d moves towards and away from the mounting table 1c, and a reciprocating cylinder 4g for reciprocating the base 4e between an operative position and a withdrawal position. A pair of the clamping jaws 4b may define a depression 4h having a shape fittable around the respective bent portions 7a of the hairpin tubes 7.

In case that the hairpin tubes 7 are arranged in a plurality of lines, a plurality of clamps 4a are provided in such a manner as to respectively correspond to these lines of the hairpin tubes 7, or each hairpin tube 7. With this arrangement, the clamps 4a can effectively clamp all of the hairpin tubes 7, even if they are arranged in a plurality of lines.

In operation, the pressure plate 11 is lowered to press and fix the prefixed heat exchanger on the mounting table 1c. The reciprocating cylinder 4g is then actuated to move the base 4e towards the mounting table 1c along the guide rail 12 so that the clamping jaws 4b are respectively positioned above and below the bent portions 7a of the hairpin tubes 7. The driving cylinder 4f is then actuated to move the clamping jaws 4b around respective pivots, enabling the clamping jaws 4b to clamp the bent portions 7a of the hairpin tubes 7. In this regard, the hairpin tubes 7 can rigidly and securely be fixed in position since the clamping jaws 4b contact a large area of the bent portions 7a via their depressions 4h. However, it is a matter of course that the depressions 4g are dimensioned so that they can snugly fit around the bent portions 7a, but can apply pressure effected by the clamping jaws 4b to the bent portions 7a when they move into clamping positions.

The mandrels 2 are then moved towards the heat exchanger 5 and press fitted into the openings 7b, and respectively form expanded portions 7d of a predetermined length. The four gripping strips 3a are then moved to a position where they can surround the corresponding expanded portion 7d of the hairpin tubes 7. The guiding cylinder 3d, then, slides along the outer surfaces of the slanting portions 3c of the strips 3a, and forcibly move the slanting portions 3c radially and inwardly, enabling the gripper 3 to securely grip the respective expanded portion 7d. In this regard, the spaces 3b between the strips 3a are maintained even when the strips 3a are brought into contact with the expanded portion 7d of the hairpin tubes 7. That is, the space 3b is preferably so determined that a plurality of the strips 3a can be positioned around the expanded portion 7d when introduced into the operative position, and can clamp the expanded portion 7d, while maintaining the space 3b. With this arrangement, the gripper 3 can grip the expanded portion 7d of varying diameter.

The mandrels 2 are then moved towards the bent portions 7a to expand the hairpin tubes 7 along their entire lengths into tight, interlocked relationship with the radiation fins 6. In this expansion stage, the clamp 4a and the grippers 3 arrest the axial movement of the hairpin tubes 7 in cooperation with each other so that the shrinkage of the hairpin tubes 7 in the axial direction thereof can substantially be prevented.

The gripping mechanism of the above arrangement can equally and securely grip all of the hairpin tubes 7, even if they are arranged in three or more lines, or arranged in closer relationship with each other. In addition, if the hairpin tubes 7 with a different diameter are expanded, it is not necessary to replace the grippers 3 with the new ones to grip the hairpin tubes 7 with a different diameter.

In addition, the clamping jaws 4b snugly fit around the bent portion 7a via their depressions 4h, the dimension of which is adjustable by controlling a clamping point where the clamping members 4a clamp the tube. This arrangement eliminates the necessity to change the clamp 4a for the tube of a different diameter.

The amount of the hairpin tube 7 that the clamp 4a clamps 4a is also adjustable by sizing the depression 4h, or by adjusting a point where the base 4e is stopped for operating the clamp 4a to clamp the hairpin tubes 7.

Figure 4A:
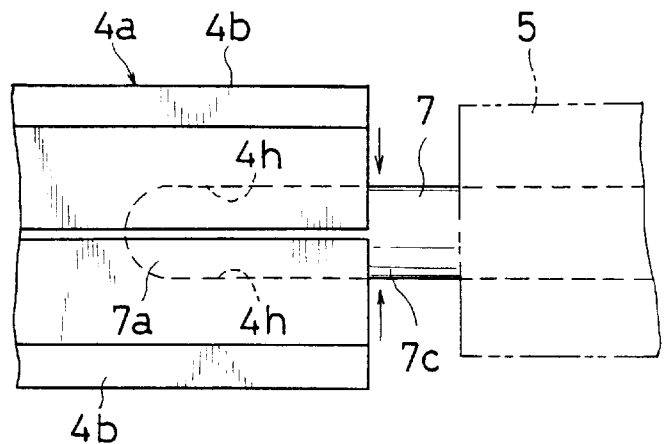
FIGS. 4A, 4B and 4C are front elevations with partial cross section illustrating a clamp of the apparatus for clamping a bent portion of a hairpin tube.
Figure 4B:
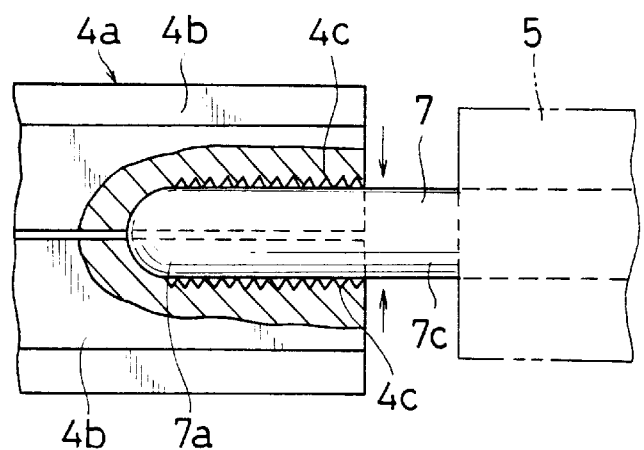
Figure 4C:
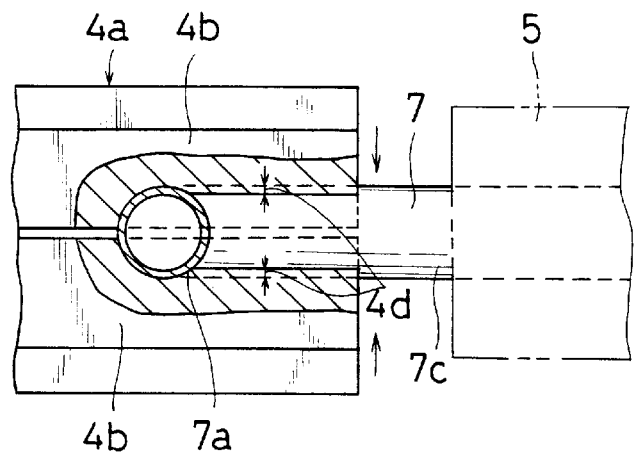

To prevent the slippage of the hairpin tube 7 within the depression 4h, inner surfaces of the clamping jaws 4b which define the depression 4h may be formed unevenly by forming, for example, a plurality of longitudinal notches 4b, and a plurality of pointed projections, as illustrated in FIG. 4B. Overhangs 4c may be formed along a line which correspond to a curve of the bent portion 7a of the hairpin tube 7, as illustrated in FIG. 4C. Various materials, for example, rubber may be provided within the depression 4h, provided that they can effectively prevent the slippage of the hairpin tube 7.

Figure 3A:
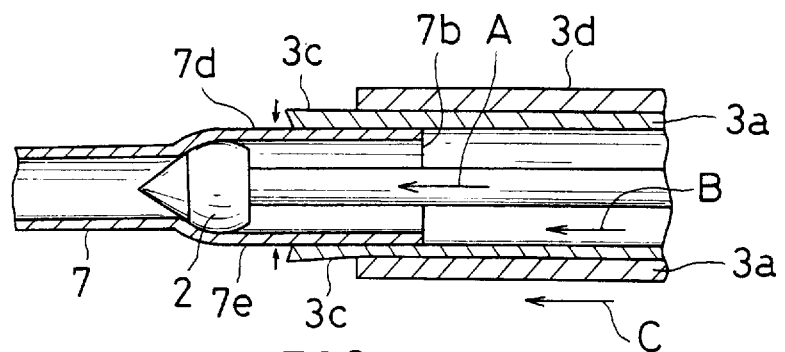
FIGS. 3A and 3B are cross section illustrating operation of the gripper.
Figure 3B:
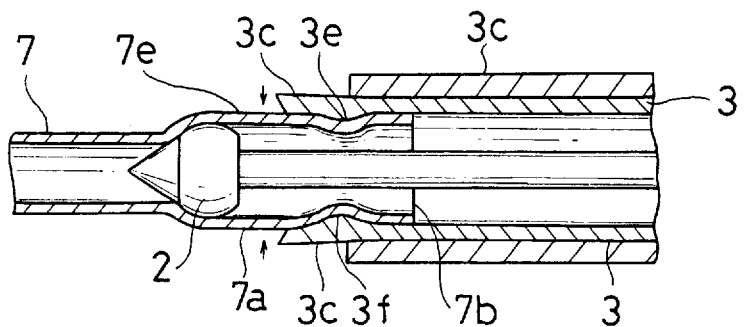

The gripping strips 3a may be provided on their clamping surfaces with radially and inwardly protruding members 3f which bite into a wall 7e of the expanded portion 7d of the hairpin tube 7 via the force effected by the guiding cylinder 3d, as illustrated in FIG. 3B. This enables the gripping strips 3 to more securely grip the hairpin tubes 7 in such a manner as to precisely locate the hairpin tubes 7. This contributes to the manufacturing of more highly precision products.

In case that the slippage of the hairpin tubes 7 within the clamp 4a is expected, it may be possible to move the clamping mechanism in the same direction as that of the movement of the mandrels 2 when expanding the hairpin tubes 7 by such a distance as to absorb the amount of the slippage, during the mandrels 2 advance to expand the hairpin tubes 7.

It may be possible to provide a holding member (not shown) to subsidiary hold any portions other than the bent portion 7a of the hairpin tube 7 at the side where the bent portion 7a protrude. The holding member may hold the hairpin tubes 7 before and after the gripper 3a grips the expanded portion 7d of the hairpin tubes 7. With this arrangement, the hairpin tubes 7 can securely be held in position during the tube expanding operation, even if the hairpin tubes 7 are loosely mounted in the heat exchanger 5.

Figure 5A:
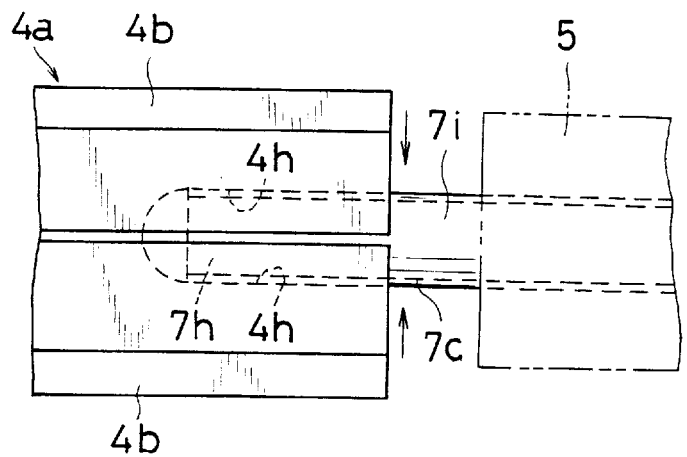
FIGS. 5A and 5B are front elevations with partial cross section illustrating a clamp of the apparatus for clamping one end of a straight tube.
Figure 5B:
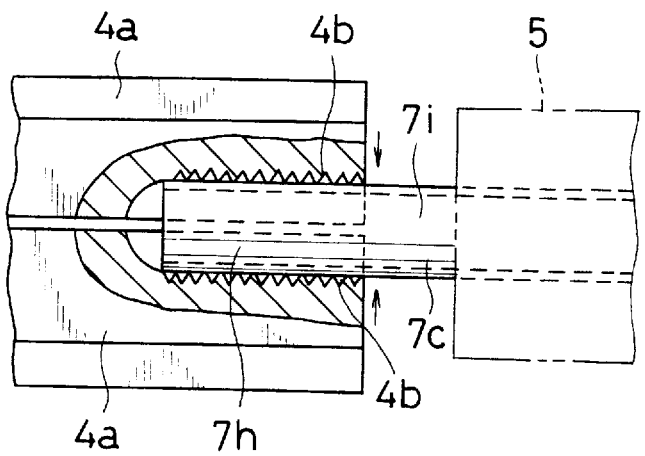
Figure 6A:
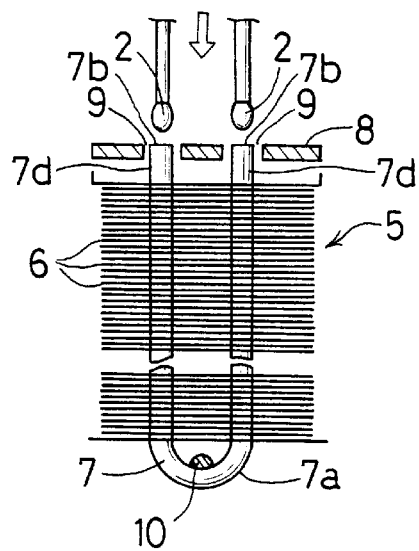
FIG. 6A is a front elevation illustrating expanding stage of tubes.
Figure 6B:
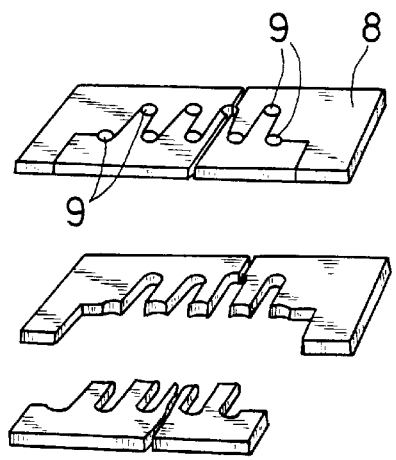
FIG. 6B is a perspective view illustrating a clamping member.
Figure 6D:
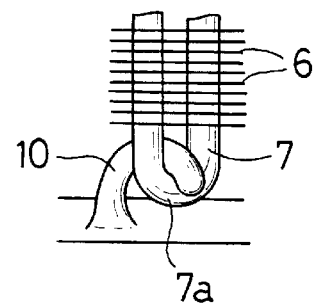
FIG. 6D is a perspective view illustrating a hook.
Figure 6C:
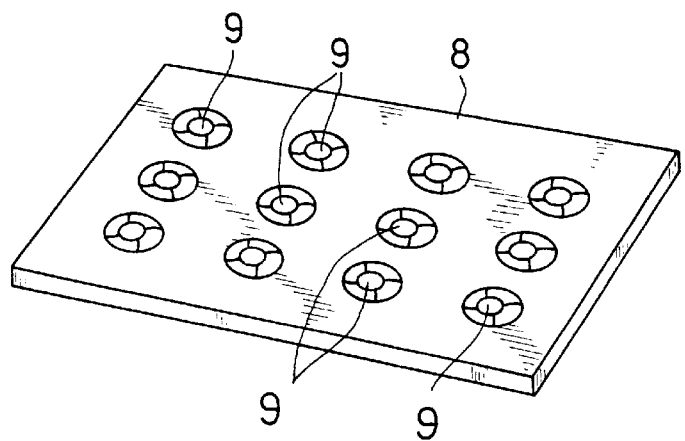
FIGS. 6C is a perspective view illustrating the clamping member of another type.

It is a matter of course that the method and apparatus of the present invention can manufacture the heat exchanger 5 with a plurality of straight tubes 7i, on which a plurality of the radiation fins 6 are loosely stacked. In this case, the grippers 3 can respectively grip one ends of the straight tubes 7i in the same manner as that they grip the hairpin tubes 7, since the shape of straight portions 7c of the hairpin tubes 7 are substantially the same as that of the straight tubes 7i. The clamps 4a can also clamp the opposite ends 7h of the straight tubes 7i, as illustrated in FIG. 5A. In this case, it may be possible to form the depression 4h corresponding in shape to the straight tube 7i, and to form the notches 4b for preventing the slippage of the straight tubes 7i within the depression 4h, as illustrated in FIG. 5B.

This specification is by no means intended to restrict the present invention to the preferred embodiments set forth therein. Various modifications to the inventive method and apparatus for manufacturing the heat exchanger as described herein, may be made by those skilled in the art without departing from the spirit and scope of the present invention.

What is claimed is:

1. An apparatus for manufacturing a heat exchanger with a plurality of radiation fins which are stacked on a plurality of hairpin tubes or straight tubes, each hairpin or straight tube having two ends, comprising:

at least one pair of clamps, each said pair of clamps comprising at least one pair of clamping jaws for clamping bent portions of the hairpin tubes or one of said ends of the straight tubes in such a manner as to arrest axial movement of the hairpin tubes or the straight tubes, respectively;

mandrels coaxially alignable with straight portions of the hairpin tubes or straight tubes, wherein said mandrels are press fittable into openings of the hairpin tubes or openings of the straight tubes are so as to form expanded portions of a predetermined length in said hairpin tubes or straight tubes;

at least one gripper with a plurality of gripping strips having longitudinal axes coaxially alignable with the hairpin tubes or the straight tubes; wherein the gripping strips are movable between a withdrawn position and an operative position in such a manner as to timely grip the expanded portions of the hairpin or straight tubes with a predetermined clearance between adjacent gripping strips as the mandrels are press fit into the hairpin tubes or the straight tubes.

2. An apparatus as set forth in claim 1, wherein a holding means is positioned at a side of the apparatus where the at least one pair of clamps engage the bent portions of the hairpin tubes or the one of said ends of the straight tubes in such a manner as to fix the hairpin tubes or the straight tubes in position.

3. An apparatus as set forth in claim 1, wherein a depression is defined in said at least one pair of said clamps so that the clamping jaws fit around the bent portions of the hairpin tubes or the one of said ends of the straight tubes.

4. An apparatus as set forth in claim 1, wherein said at least one pair of clamping jaws are provided with a means for preventing slippage of the hairpin tubes or the straight tubes.

5. An apparatus as set forth in claim 1, wherein the gripping strips of each gripper are provided with radially and inwardly protruding members for biting into a wall of the expanded portion of a corresponding hairpin tube or straight tube.

6. An apparatus for manufacturing a heat exchanger with a plurality of radiation fins which are stacked on a plurality of hairpin tubes or straight tubes, each hairpin or straight tube having two ends, comprising:

at least one pair of clamps, each said pair of clamps comprising at least one pair of clamping jaws for clamping bent portions of the hairpin tubes or one of said ends of the straight tubes in such a manner as to arrest axial movement of the hairpin tubes or the straight tubes, respectively;

mandrels coaxially alignable with straight portions of the hairpin tubes or straight tubes, wherein said mandrels are press fittable into openings of the hairpin tubes or openings of the straight tubes so as to form expanded portions of a predetermined length in said hairpin tubes or straight tubes;

at least one gripper with a plurality of gripping strips having longitudinal axes coaxially alignable with the hairpin tubes or the straight tubes; wherein the gripping strips are movable between a withdrawn position and an operative position in such a manner as to timely grip the expanded portions of the hairpin or straight tubes as the mandrels are press fit into the hairpin tubes or the straight tubes.

7. An apparatus as set forth in claim 6, wherein a holding means is positioned at a side of the apparatus where the at least one pair of clamps engage the bent portions of the hairpin tubes or the one of said ends of the straight tubes in such a manner as to fix the hairpin tubes or the straight tubes in position.

8. An apparatus as set forth in claim 6, wherein a depression is defined in said at least one pair of said clamps so that the clamping jaws fit around the bent portions of the hairpin tubes or the one of said ends of the straight tubes.

9. An apparatus as set forth in claim 6, wherein said at least one pair of clamping jaws are provided with a means for preventing slippage of the hairpin tubes or the straight tubes.

10. An apparatus as set forth in claim 6, wherein the gripping strips of each gripper are provided with radially and inwardly protruding members for biting into a wall of the expanded portion of a corresponding hairpin tube or straight tube.

* * * * *